United States Patent
Mingaliev et al.

(10) Patent No.: US 12,410,779 B2
(45) Date of Patent: Sep. 9, 2025

(54) METHOD AND SYSTEM FOR VISUAL INSPECTION OF WIND TURBINE GENERATORS

(71) Applicant: Ventus Engineering GmbH, Vienna (AT)

(72) Inventors: Shavkat Mingaliev, Vienna (AT); Poul Anker Skaarup Lübker, Baar (CH); Xavier Tolron, Vienna (AT); Chrysanthos Galetsas, Vienna (AT); Eric Jacob Rose, Vienna (AT); Jorge Fernández Barrio, Vienna (AT)

(73) Assignee: Ventus Engineering GmbH, Vienna (AT)

( * ) Notice: Subject to any disclaimer, the term of this patent is extended or adjusted under 35 U.S.C. 154(b) by 292 days.

(21) Appl. No.: 17/797,102

(22) PCT Filed: Feb. 3, 2021

(86) PCT No.: PCT/EP2021/052522
§ 371 (c)(1),
(2) Date: Aug. 2, 2022

(87) PCT Pub. No.: WO2021/156296
PCT Pub. Date: Aug. 12, 2021

(65) Prior Publication Data
US 2023/0106537 A1    Apr. 6, 2023

(30) Foreign Application Priority Data
Feb. 3, 2020    (EP) ..................................... 20155159

(51) Int. Cl.
*G06T 7/00*    (2017.01)
*F03D 17/00*    (2016.01)

(52) U.S. Cl.
CPC .............. *F03D 17/00* (2016.05); *G06T 7/001* (2013.01); *F05B 2260/80* (2013.01); *G06T 2207/20104* (2013.01)

(58) Field of Classification Search
CPC .................... F03D 17/00; G06T 7/001; G06T 2207/20104; G06T 2200/24;
(Continued)

(56) References Cited

U.S. PATENT DOCUMENTS

2013/0307961 A1* 11/2013 Puigcorbe ............... F03D 17/00
                                                              348/82
2016/0146194 A1*  5/2016 Christiansen ............. F03D 1/00
                                                              73/788
(Continued)

FOREIGN PATENT DOCUMENTS

EP    2369176 A1    9/2011
EP    2481924 A1 *  8/2012   .......... F03D 11/0091
(Continued)

*Primary Examiner* — Solomon G Bezuayehu
(74) *Attorney, Agent, or Firm* — Dykema Gossett PLLC

(57) ABSTRACT

Disclosed is a method of visually inspecting a wind turbine generator (WTG) and parts thereof during operation. The method comprising acts of pointing a visual inspection system with a field of view about a line of sight in a plane of rotor blade of the wind turbine generator (WTG); of capturing multiple images of the field of view using the visual inspection system; of selecting at least one reference image amongst the captured images or from elsewhere; of comparing the at least one other captured image with the at least one reference image; and thus inspecting structural aspects of the wind turbine generator (WTG) as a function of the result of the act of comparing.

15 Claims, 11 Drawing Sheets

(58) Field of Classification Search
CPC . G06T 2207/10016; G06T 2207/30164; F05B 2260/80; F05B 2270/8042; F05B 2270/328; F05B 2270/8041; Y02E 10/72; G01S 17/89
See application file for complete search history.

(56) References Cited

U.S. PATENT DOCUMENTS

| | | | | |
|---|---|---|---|---|
| 2016/0196643 | A1* | 7/2016 | Bendall | G06T 7/62 |
| | | | | 382/108 |
| 2018/0259955 | A1* | 9/2018 | Noto | G08G 5/55 |
| 2019/0072082 | A1* | 3/2019 | Lysgaard | G06T 7/001 |
| 2019/0124250 | A1* | 4/2019 | Wolf | A61B 1/126 |
| 2019/0304077 | A1* | 10/2019 | Wang | G06V 20/46 |
| 2021/0071647 | A1* | 3/2021 | Girolamo | H04N 23/54 |
| 2022/0099067 | A1* | 3/2022 | Packer | F03D 17/00 |
| 2022/0195994 | A1* | 6/2022 | Elberling | G06T 7/001 |
| 2023/0106537 | A1* | 4/2023 | Mingaliev | F03D 17/00 |
| | | | | 702/33 |

FOREIGN PATENT DOCUMENTS

| | | | |
|---|---|---|---|
| EP | 2484904 | A2 | 8/2012 |
| EP | 3415754 | A1 | 12/2018 |
| EP | 3430255 | A1 | 1/2019 |
| FR | 2882404 | A1 | 8/2006 |
| WO | 2016033181 | A1 | 3/2016 |

\* cited by examiner

A:

B:

METHOD AND SYSTEM FOR VISUAL INSPECTION OF WIND TURBINE GENERATORS

CROSS-REFERENCE TO RELATED APPLICATIONS

This application is a national stage filing based upon International PCT application no. PCT/EP2021/052522, filed 3 Feb. 2021, which claims the benefit of priority to Europe application No. 20155159.5, filed 3 Feb. 2020.

BACKGROUND OF THE INVENTION

Field of the Invention

The present invention relates to a method and system of visual inspection of a wind turbine generator.

Description of Prior Art

Inspection of wind turbine generators is important to improve performance and minimize operational and maintenance costs. Inspection of static, i.e. at stand-still, as well as dynamic, i.e. operating, wind turbines is the scope of this disclosure.

Improvements in availability of types of inspections as well as accuracy are needed. Furthermore, ease of use and reliability including consistency is also to be improved.

EP 3 430 255 A1 discloses a system and method of visually inspecting a wind turbine (WTG) during operation by positioning a visual inspection system using a line scan camera with a line of sight aligned with the rotor plane. The camera captures multiple images of the wind turbine blades and parts of the hub, the nacelle and the wind turbine tower. The images are compared with a reference image to detect structural aspects (damages) of the wind turbine blades. The camera is triggered using a phase lock loop (PLL) technology to synchronize the captured images with a virtual reference image.

EP 2 369 176 A1 discloses a system and method of visually inspecting a wind turbine during operation by positioning a visual inspection system using a high speed camera with a line of sight aligned with the rotor plane. The camera captures multiple images of the wind turbine blades and parts of the hub, the nacelle and the wind turbine tower during operation. The images are analysed using image processing, where the operator analyses the images in an interactive computer program. The computer program is configured to compensate for the tilt angle of the nacelle WO 2016/033181 A1 discloses a system and method of inspecting a wind turbine during rotation by positioning a visual inspection system using a platform with digital camera with a line of sight relative to the rotor plane. The camera captures multiple images of the wind turbine blades during operation. The images are analyzed using image processing where the operator selects images based on the captured images. An area of interest is selected on the images and blade metrics, e.g. signal-to-noise ratio, is calculated.

Although the above cited disclosures relate to diagnosing a wind turbine, the disclosures merely collect data or images in a brute-force-way. The above cited disclosures are not suited for diagnosing dynamic aspects of wind turbine parts.

SUMMARY OF THE INVENTION

Description

An objective is achieved by a method of visually inspecting a wind turbine generator (WTG) and parts thereof during operation. The method comprises acts as will be disclosed in the following.

The method in particular relates to wind turbine generators in operation, i.e. while the rotor is rotating. This is referred to as dynamic inspection. The method may also be applied to wind turbines during stand still. This is referred to as static inspection.

There is an act of pointing a visual inspection system with a field of view about a line of sight in a plane of rotor blade of the wind turbine generator (WTG). Thus, the blade axis will be aligned with the line of sight at some point during the turning of the rotor during operation of the wind turbine generator.

The visual inspection system may be mounted on the ground using suitable means to fix and adjust the line of sight. A tripod may be used or some other stationary support means.

The visual inspection system generates a stream of images of the field of view i.e. the live view. Based on the content or information in the field of view there is a triggering based on the field of view. Thus as will be evident in the following the triggering may be based on changes in the view. The triggering may be of a parameter extracted from the view.

There is an act of capturing multiple images of the field of view using the visual inspection system.

The capturing of images of the field of view may be of multiple images with at least part of the rotor blade in the image. The positioning or pointing may be adjusted in order to capture suitable images.

There is an act of selecting at least one reference image amongst the captured images. The act of selecting may also be from reference images made available from other wind turbine generators, from a design or from a historic library of images, say from completion of assembly, from a previous inspection or calibration of the wind turbine generator.

Selecting may be of one or more images and thus, disregarding others. The selection may be by processing images, classifying images or filtering images as will be disclosed. Selecting may also be by an operator of the system via an interface.

There is an act of comparing the at least one other captured image with the at least one reference image. The act of comparing will be disclosed, but generally a comparison between one or more reference images and at least one captured image is performed. The comparison may be based on identifying features such as edges, intensities, colours, markers, or the like.

There is an act of inspecting aspects, or structural aspects, of the wind turbine generator (WTG) as a function of the result of the act of comparing.

Thus, inspection may be with respect to certain quantities such as structural quantities of the wind turbine generator. Those may be blade pitch angle, the angle the blade is mounted with on the hub, blade bending, blade twisting, blade profile, misalignments, e.g. shifts, or general surface properties including damages, dents, and alike.

This allows for systematic collection of images, organisation of images and processing of images to perform improved inspection of wind turbine generator parts including blades and differences of blades.

Hence, the visual inspection allows the capture of optimised or maximum energy from the wind and to minimize loads on the wind turbine rotor and on other main components in wind turbines and in consequence hereof extend or reach the maximum life time of the wind turbine generator. The visual inspection enables the rotor to be adjusted or balanced.

Inspection may be more accurate and faster than manually capturing images and analysing the images and extracting information about the wind turbine generator.

In an aspect, the act of capturing is performed after an act of triggering.

The act of triggering may be according to a trigger which setting is performed using a graphical user interface (GUI) configured to present at least one captured image and with at least one means for an operator to adjust a parameter.

The parameter may be a feature of the image. It may be a pixel value, a location of an edge or alike. In an aspect an operator may have defined a region of interest (ROI) or a point of interest (POI).

Triggering may be auto-triggering, where an algorithm of the camera or additional external equipment connected to the camera provides a trigger when the brightness conditions on the specified ROI change. A computer may be controlling the camera Therefore, when the blade tip is passing through the ROI, the brightness conditions change and a trigger is initiated.

Triggering may be software triggering or semi-automated. This may be a triggering option where a mean value of the brightness in the ROI is calculated. When the blade is passing through the ROI, there is a peak indicating the change of this mean brightness value. When this signal is captured, the camera is triggered (See example).

The advantage of this the software triggering option is that an operator can check/change this signal and, by using various options, try to capture it in the most efficient way.

A further advantage of using the outlined trigger is that wind turbine generators operate with variable or semi-variable speed continuously adjusting to the wind condition like gusts etc., and therefore, a trigger as known hereto is very difficult/if not impossible to calculate based on historical data collected from the rotor operation.

Triggering may be manual triggering which option is used in a situation where the other two options are not working optimally. For example, changes in brightness conditions, high wind speed with bending variations, shiny blade surface, etc. may require manual triggering.

In an aspect, there is an act of sorting the captured images. The act of sorting may be performed by image processing. Sorting or filtering may involve choosing captured images and disregarding other images. Sorted images may arrange images in a specific order or generate a set of sorted images (or elected) images. Arranged images may be divided by a threshold or any other criteria.

Sorting images may be automated, semi-automated (requiring operator input) or manual.

Sorting may be during a dynamic measurement where several pictures are captured or taken for every blade whenever the blade is passing through the selected region of interest.

Out of these images, one is selected as a reference in order to match the other two blades in terms of inspection, such as horizontal alignment. This procedure defines the sorting step of the post-process analysis, completed prior to an inspection. This procedure is performed manually and/or automatically with the use of software.

The advantage of this sorting procedure is that, regardless of any change in the rotational speed of the wind turbine, even within one rotation which will inevitably affect the triggering of the camera, one can efficiently select one image per blade that matches perfectly with the other two blades in terms of inspection requirements, including those of horizontal alignment.

An advantage of the automation of this procedure is time efficiency demands for operating on site directly after inspection. A manual sorting would require a couple of hours while the automated sorting can provide the same results in a couple of minutes. Furthermore, the sorting allows the collection of appropriate images that will also increase accuracy and expand the number of inspections possible.

In an aspect, the act of sorting is performed by an input from an operator and involves an act of defining a region of interest (ROI) in a reference image and selecting captured images, based on the region of interest (ROI).

The automated sorting procedure may be affected from significant changes during the measurement. Such changes may be in the surrounding brightness, blade bending, and weather conditions. In an aspect automated sorting acts may be configured to isolate those changes and not allow them to affect the final sorting outcome. This could be done by one or more of the following acts: Using multiple regions of interest in order to define and account for tower movement and blade bending. Using a motion detection algorithm, a correlation between the different recorded blade passing is found. This correlation allows to get a preliminary sorting that will assist the whole procedure. Using black recorded images, the pixel values of the original recorded images are calibrated in order to reduce the image noise level and improve the image processing and detection techniques. Using blade labelling application, the sorted images which correspond to each blade may be labelled and sorted in consecutive rotations.

By way of example, images may be captured by a high-speed camera, which at the present time has a maximum frame rate of 543 frames per second (fps). With that frame rate, a total number of 5900 images can be recorded. Therefore, with 100 images/trigger (default value), a total amount of 59 blade passings, or 19 full rotor rotations, can be recorded. A person skilled in the art will find it natural to apply the available cameras and their ever increasing capacity and ever decreasing price to balance the needs of an inspection.

This exemplary number of recorded rotations is targeted in order to assure that there will be enough data for the accurate calculation of, in this case, an inspection of a relative blade pitch misalignment between the wind turbine blades.

In example, what influence the accuracy of an inspection such as a relative blade pitch misalignment is that appropriate triggering and/or sorting results in improved or new inspections. In example, it may be possible to inspect WTG blade pitch change during the measurement. With a high number of recorded rotations, better or more measures of pitch angle change can be detected by comparing the results of each rotation with the consecutive ones and filtering out rotations where the overall pitch angle is different.

In example, this filtering out rotations, where the relative blade pitch angles differ to the other rotations, which, in example could be due to the fact that the wind turbine generator blade pitch system has been activated during this specific rotation.

Capturing or acquisition may be computer implemented, as software is used for both the static and dynamic measurements. The difference between the two measurements is that the static measurement does not need any actual triggering of the camera, since the wind turbine rotor is not rotating during the inspection, where each blade is locked at the exact same position during inspection. To hereto address unforeseen triggering issues for dynamic inspection, the following aspect has been found to provide a reliable set of images for selecting and sorting.

In an aspect, the act of capturing relevant images is performed after the act of triggering according to a trigger that is initiated as a function of the region of interest (ROI).

This is a triggering option where the mean value of the brightness in the ROI is calculated. When the blade is passing through the ROI, there is a peak indicating the change of this mean brightness value. When this signal is captured, the camera is triggered (See example).

The advantage of this triggering option is that one can check/change this signal and, by using various options, try to capture it in the most efficient way.

In an aspect, the act of triggering is initiated as a function of the region of interest (ROI) as when a brightness value of the region of interest (ROI).

This is a triggering option where the mean value of the brightness in the ROI is calculated. When the blade is passing through the ROI, there is a peak indicating the change of this mean brightness value. When this signal is captured, the camera is triggered. A person skilled in the art will appreciate variation of such methods, including tuning, or adjusting, of parameters as will be exemplified.

In an aspect, the act of inspecting comprises an act of determining a deviation amongst blades, wherein the act of inspecting involves applying a set of blade metrics to the reference image, and wherein the act of comparing is performed by blade metrics applied to the reference image compared to the blade metrics of at least one captured image.

Having a reference image and one or more captured images, optionally images provided by sorting, allows for introducing new measures of inspections or increasing accuracy of inspections.

In example, blade pitch requires one metric to determine basically an angle. Blade bending requires a different metric. Other structural changes e.g. twisting and/or shifts may require yet another metric.

In example of analysis of the dynamic inspection of say, relative blade pitch misalignment, it should be noted that the relative blade pitch misalignment is calculated at the same rotation for several consecutive rotations. Then the results of each rotation are compared to the other consecutive rotations. The ones where the pitch angle is different, or significantly different, are filtered out. This is achieved by sorting. The final results are based on the ones that have been calculated repeatedly on a number of consecutive rotations. This filtering or sorting is done in order to avoid miscalculation of the relative blade pitch misalignment from a possible blade pitch change, e.g. from a possible blade pitch change due to the blade pitch system actually changing the pitching of the blades. Using this filtering or sorting also means that pitching information from the WTG is not needed during the inspection.

In example, and as will be detailed later, the method imposes a metric based on the nacelle edges and, therefore, a nacelle line may be defined for every blade. Thus, the recording and following of the nacelle movement in each picture, allows assuring that the relative blade pitch misalignment calculation is not influenced by tower movement or nacelle line angle changes. The inspection is thus calibrated to fixed points or reference points of the wind turbine generator.

Both the static and dynamic measurement analyses the max chord area. Alternative analyses could be performed using other chord areas along the blade, i.e. using other metrics or refined metrics.

Thus, in an act of inspecting, there may be an act of determining relative pitch misalignment between at least two blades wherein the act of inspecting involves applying a set of pitch angle metrics to the reference image and the at least one other captured image. There may be an act of comparing that is performed on the pitch angle metrics of the reference image and those of the at least one other captured image.

As will be exemplified, such acts have the advantage that the calculation of relative blade pitch misalignment between the wind turbine blades improves in accuracy and in time efficiency to a degree or order that allows for the inspection and determination of the relative blade pitch misalignment result to be performed on site, and any blade pitch correction needed can be done immediately after as part of the inspection process.

In an aspect, the act of sorting may involve an act of defining one or more regions of interest (ROI) of the wind turbine generator (WTG) on the reference image and the at least one other captured image, wherein at least one region of interest (ROI) is a reference region of interest (RROI), and wherein there is an act of transforming at least one other captured image, the act being performed according to the reference region of interest (RROI) of the reference image.

Applying regions of interest as outlined improves the data processing.

In example of an inspection of the relative blade pitch misalignment between the wind turbine blades, a variety of image processing methods are used. These include pattern and feature recognition, pixel coordinate detection, pixel-by-pixel difference, brightness management, angle calculations, and slope and proportion evaluations.

The operator selects or defines one or multiple regions of interest (ROI)—as will be exemplified by rectangles later-following the principles mentioned above.

Some ROIs, reference regions of interest (RROI), are defined on fixed or stationary features, e.g. on the nacelle, some ROIs on moving features, e.g. a blade.

The acts that might be implemented on a computer detect the defined edges of the first image in all the other sorted blade images, and calculate the angle difference between the two lines (nacelle line and blade line) for each of them.

After the calculation of the reference angles for each blade, the reference angle result for each blade is subtracted from the corresponding result of the previous blade, e.g. Blade A-Blade B, and the relative blade pitch misalignment between the three blades may automatically be calculated.

Thus, in an aspect, at least two reference regions of interest (RROI) and a set of wind turbine metrics are defined by at least one relative region of interest (ROI) and wherein there is an act of transforming, i.e. geometrically transforming, the least one relative region of interest (ROI) before comparing the transformed wind turbine metrics.

Thus, one or more images may be calibrated or aligned according to reference, anchoring, or fixed structural points. The transformation, i.e. geometric transformation, may be a shift, a rotation, scaling of an image, or similar operations on an image to align reference regions of interests, edges, structural features etc. within a region of interest of images.

In an aspect the act of sorting comprises sorting captured images according time duration between consecutive triggers to filter out captured images where a trigger was skipped. Hence, when there is such an indication of a skipped trigger and as a result a skipped blade, a full rotation that would include this blade is filtered out.

In an aspect the act of sorting includes a preliminary sorting based on a correlations of different captured images. This correlation allows to limit the search to get a preliminary sorting that will assist the whole procedure. Hence one or more reference images may readily be available for selection by the operator and one or more regions of interest may also defined by the operator to isolate features of the picture that assist the sorting procedure. Using the input from the previous acts, the software automatically, per recorded rotation, is capable of finding one picture per blade that matches the most the reference image/images in terms of e.g. horizontal blade alignment.

An objective is achieved by a visual inspection system comprising means for performing the act as disclosed.

A person skilled in the art will be able to select appropriate image capturing devices and computers including portable computers that can be used on site.

In an aspect, the visual inspection system may include an image capturing device configured with a field of view about a line of sight, and a computational unit configured with an interface means configured to define at least one region of interest (ROI) on a captured image and for selecting at least one reference image.

The image capturing device may be a high speed type of camera, a line scan camera or any other suitable camera including e.g. a scanning LiDAR. The image capturing device may be a high speed type of camera, a line scan camera or any other suitable camera or LiDAR technology.

In an aspect there may be an act of using black recorded images and the pixel values of the original recorded images may be calibrated in order to reduce the image noise level and improve the image processing and detection techniques. Black images are defined as the ones that the brightness level is the minimum possible, which in practice can be achieved by recording images with the lens covered.

The acts may be programmed in a computer program product comprising instructions to cause the visual inspection system to perform the acts as disclosed. The instructions may be on a computer-readable medium having stored thereon the computer program.

The above disclosed actions are exemplified in view of blade pitch misalignments as will be exemplified in the description of the drawings. However, a person skilled in the art may apply the methods and acts to other types of inspections, including bending of blades, twisting of blades, profiles of blades, structural changes, damages, and refined inspections with more details or accuracy.

The outlined visual inspection methods and systems may also be applied across a wind turbine generator fleet, where comparisons may be performed.

In an aspect, the act of selecting at least one reference image is performed by selecting an image from another wind turbine generator or a design manual. Thus, the reference image may be from the design or from a wind turbine generator of a similar type and possibly selected due to a reference performance.

This disclosure has exemplified the visual inspection based on the individual misalignment in between the blades on a specific WTG, but the disclosed visual inspection may also be applied to compare/relate, say the pitch angles on the actual inspected WTG, with other relevant reference pitch angles.

In example, the most efficient pitch angle in operation is defined/identified from inspections and investigations done on other wind turbine generators, by the owner, by an OEM or otherwise defined/identified.

As such pitch angle misalignment in such a case could therefore be defined both in between the X blades on the WTG inspected—and also related to an ideal pitch angle defined from other inspections by the owner, by the OEM, or otherwise.

BRIEF DESCRIPTION OF DRAWINGS

Embodiments of the invention will be described in the figures, whereon.

| | |
|---|---|
| Visual inspection system | 10 |
| Image capturing device | 11 |
| Field of view | 12 |
| Line of sight | 14 |
| Computational unit | 16 |
| Reference image | 20 |
| Reference point | 21 |
| Captured images | 22 |
| Region of interest | ROI |
| Reference region of interest | RROI |
| Wind turbine generator | WTG |
| Wind turbine metrics | 40 |
| Wind turbine tower | 46 |
| Nacelle | 48 |
| Rotor blade | 50 |
| Rotor | 51 |
| Blade metrics | 52 |
| Rotor plane | 53 |
| Pitch angle metrics | 54 |
| Relative pitch misalignment | 58 |
| Graphical user interface | GUI |
| Trigger | 60 |
| Parameter | 62 |
| Method of visually inspecting | 1000 |
| Pointing | 100 |
| Capturing | 200 |
| Triggering | 210 |
| Selecting | 300 |
| Adjusting | 310 |
| Sorting | 400 |
| Defining | 410 |
| Comparing | 500 |

| | |
|---|---|
| Inspecting | 600 |
| Determining | 610 |
| Transforming | 900 |

DETAILED DESCRIPTION OF THE INVENTION

Figure 1:
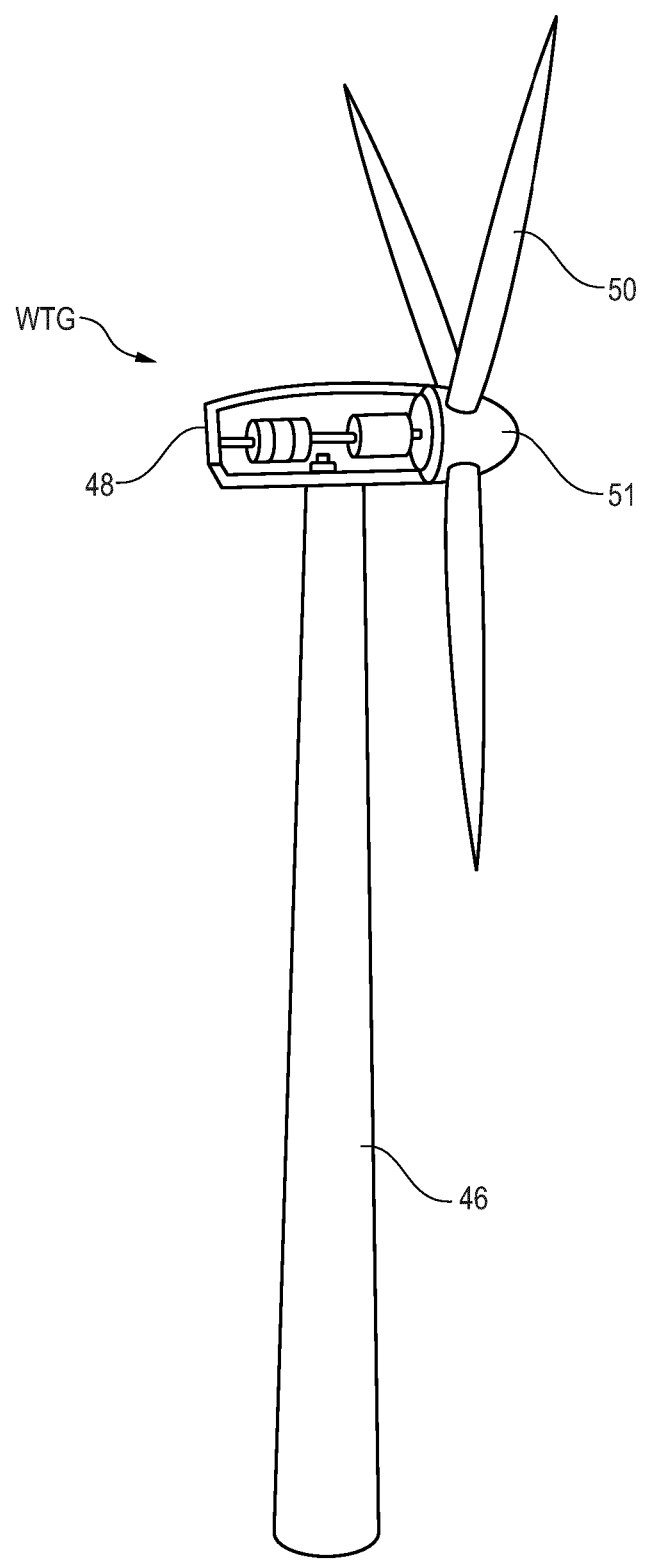
FIG. 1 illustrates a wind turbine generator.

FIG. 1 illustrates a wind turbine generator WTG comprising a tower 46 supporting a nacelle 48 with blades 50 rotably connected and forming a rotor 51.

FIGS. 2A and 2B illustrates in view of FIG. 1 a method of visually inspecting 1000 a wind turbine generator WTG and parts thereof during operation. Parts may include blades 50. In this case a wind turbine generator WTG is illustrated with three blades 50I, 50II, 50III.

The inspection of the wind turbine generator includes pointing a visual inspection system 10 with a field of view 12 about a line of sight 14 in a plane 53 of rotor blade 50 of the wind turbine generator WTG.

FIG. 2A discloses three visual inspection systems 10I, 10II, 10III. This may not always be the case or necessary. In some situations there may be a single visual inspection system 10 having one of the positons disclosed in FIG. 2A, or two visual inspection systems 10 positioned on either side of the wind turbine generator WTG, or the first visual inspection system 10 at a centre position below the rotor 51 and the second visual inspection system 10 on either side of the wind turbine generator WTG.

FIG. 2B discloses a side view of the wind turbine generator WTG. The visual inspection system 10 has a field of view 12 about a line of sight 14 in a plane 53 of rotor blade 50.

The visual inspection system 10 is in communication with a computational unit 16.

In example, there is a camera setup used for both static and dynamic measurements. During a static measurement, the wind turbine is in standstill, while during the dynamic measurement the turbine is in operation. In both measurements, the camera setup is positioned in order to align with the blade length axis.

Figure 3:
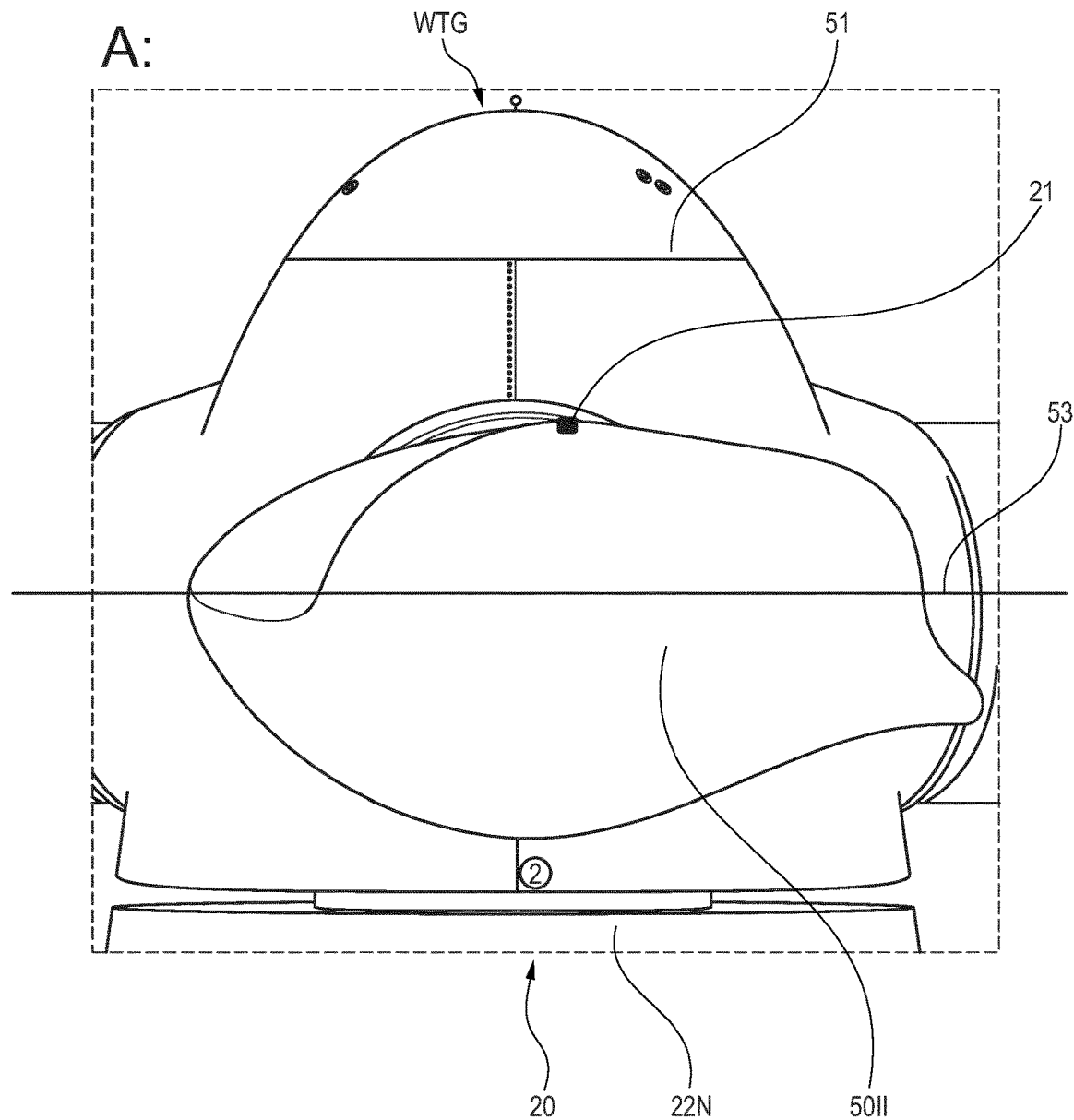
FIG. 3 illustrates a single captured image of a field of view and a representation of a series of captured image.
Figure 3:
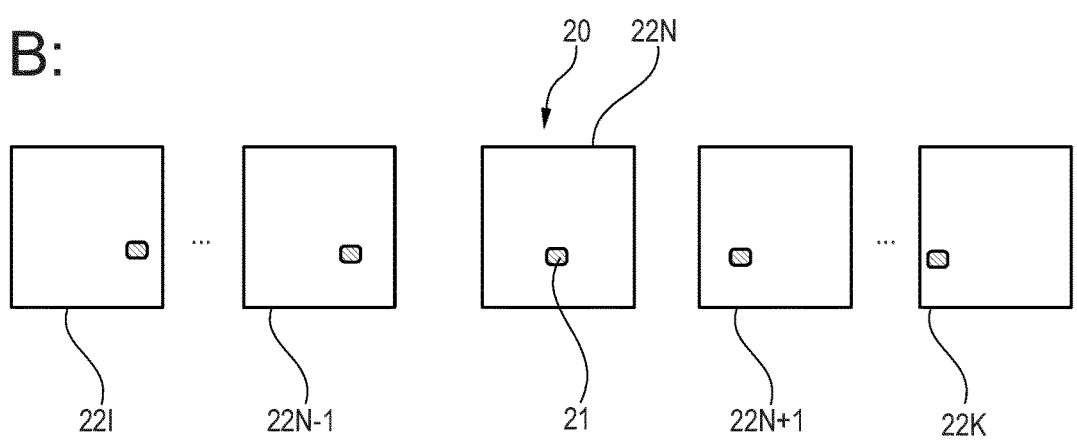

FIG. 3 illustrates the result of an act of capturing 200 multiple images of the field of view 12 using the visual inspection system 10.

FIG. 3A discloses a single captured image 22N of a wind turbine generator WTG. The captured image 22N shows the rotor 51 and a tip of a rotor blade 50II. The straight black line represents the rotor plane 53. The tip of the rotor blade 50II is in this case a reference point 21.

FIG. 3B illustrates a series of captured images 22I-22N-22K, the total number of captured images is K, where K may be set according to the camera or high speed camera used as well as settings depending on the rotational speed of the rotor and the type of inspection.

FIG. 3B illustrates how the reference point 21 moves from one side of the captured image 22I to the opposite site 22K.

An operator may select a reference image 20 amongst the captured images 22I-22K.

Figure 4:
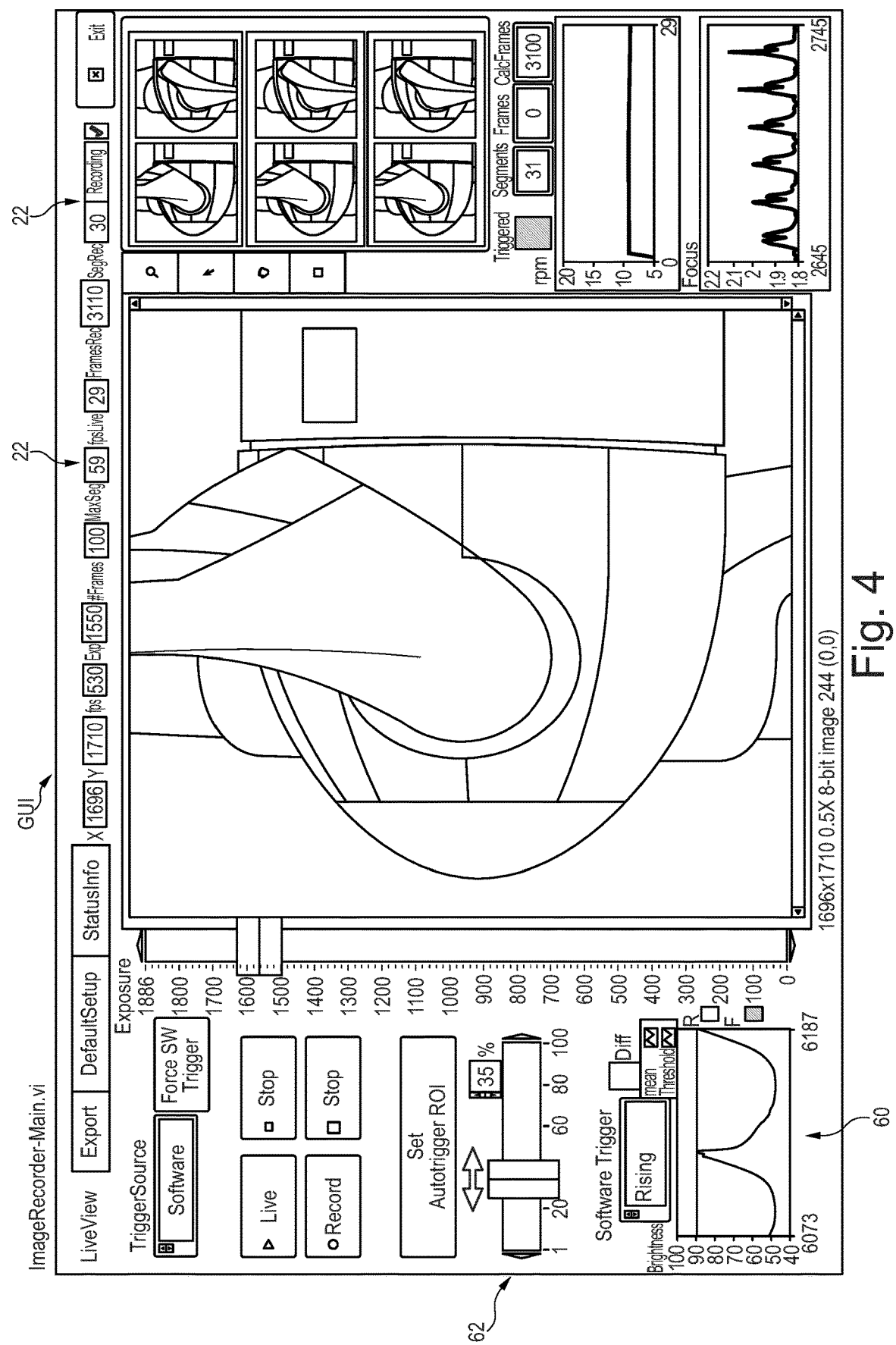
FIG. 4 illustrates a graphical user interface according to the invention.

FIG. 4 illustrates a graphical user interface GUI according to the invention.

An operator can, by using the graphical user interface GUI, change a parameter 62 such that a trigger 60 of a visual inspection system 10 is changed to a correct value in the sense of an optimal value during operation. It has shown that such human interface provides easy and reliable adjustments, as conditions may change from inspection to inspection. In the present case, the trigger level is changed with at least one means for adjusting. In the present case, the means for adjusting is a slider controlling the parameter 62, which changes a level on the graph displayed in the lower left corner of the GUI. The level on the graph corresponds to the trigger level 60 (shown as a straight white line). An example of this graph is disclosed in detail in FIG. 5.

Thereby, the act of capturing 200 is performed by the visual inspection system 10 after an act of triggering 210. The GUI is configured to present at least one captured image 22.

In view of the setups illustrated in FIGS. 1 to 4, an inspection may be performed in example where there may be a step 1, where a camera set-up is positioned on the ground targeting the wind turbine blades, aligned with the blade length axis, while the turbine is operating.

There may be a step 2, where the operator defines measurement parameters like the number of pictures per capture or trigger, the brightness level and a region of interest (ROI) for triggering.

There may be a step 3, using a capture or acquisition software where a pre-defined number of images are taken for every wind turbine blade by triggering the camera whenever the blade passes the selected region of interest. The recording application can be adjusted by the user or operator in order to adapt to any changes in the brightness and/or rotational speed of the rotor, as these affect the triggering of the camera.

There may be a step 4, during recording, where a quality check of the image capture or acquisition is performed by checking a live acquisition image and the first and last images of every blade passing to assure that these are in the desired rotational range.

Figure 5:
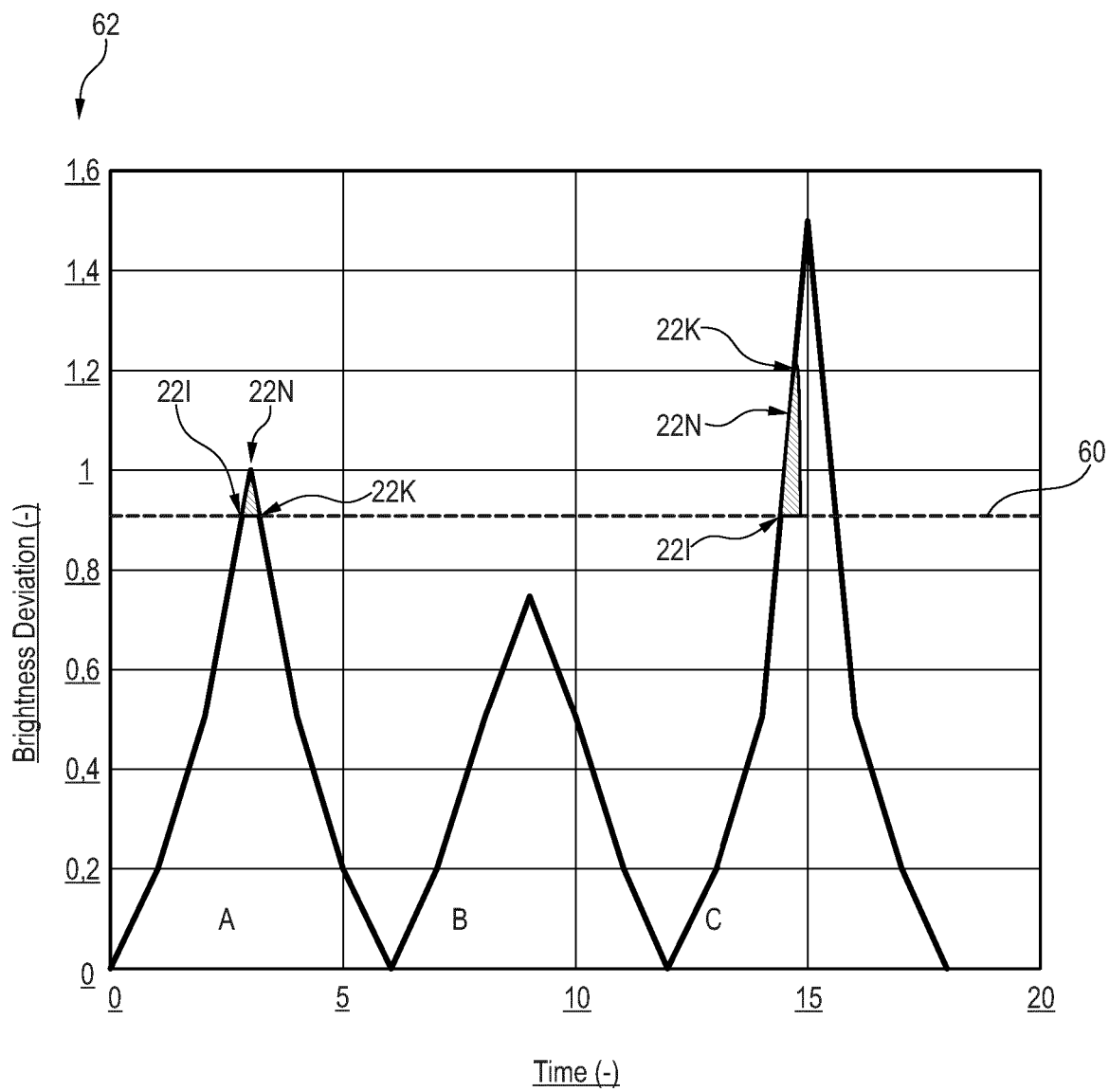
FIG. 5 illustrates a graph showing three different cases each giving different results.

FIG. 5 illustrates a graph showing three different cases (A, B, C), each giving different results.

This is a triggering option where the mean value of the brightness in a region of interest ROI is calculated. When a blade is passing through the ROI, there is a peak indicating the change of this mean brightness value. When this signal is captured, the camera is triggered.

The advantage of this triggering option is that one can check/change this signal and, by using various options, try to capture it in the most efficient way. The trigger option is implemented and controlled by the parameter 62 from FIG. 4.

The parameter 62, from which the trigger 60 is adjusted, is relative brightness deviation.

Case A: Here the trigger 60 has been adjusted by an operator to a correct level. The resulting act of capturing multiple images 22 of the field of view 12 using the visual inspection system 10 is that captured images 22I-22N-22K is captured on both sides of the maximum. Case A corresponds to the case disclosed in FIG. 3A-B.

Case B: Here the trigger 60 has been adjusted by an operator to an incorrect level as the visual inspection system 10 is not triggered during a pass of a rotor blade 50.

However, the operator will be aware of this due to the graphical user interface GUI disclosed in FIG. 5. The GUI will display the graph (B) and it will be directly evident from the graph that the trigger 60 should be adjusted by lowering the trigger level.

Case C: Here the trigger 60 has been adjusted by an operator to an incorrect level as the visual inspection system 10 is triggered too early during a pass of a rotor blade 50. The visual inspection system 10 will begin capturing 200 multiple images, as illustrated by the sequence of images 22I ... 22K. of the field of view 12. However, the number of captured images 22 will reach K before the maximum of the graph is reached.

However, the operator will be aware of this due to the graphical user interface GUI disclosed in FIG. 5. The GUI will display the graph (C) and it will be directly evident from the graph that the trigger 60 should be adjusted by increasing the trigger level 60.

Figure 6:
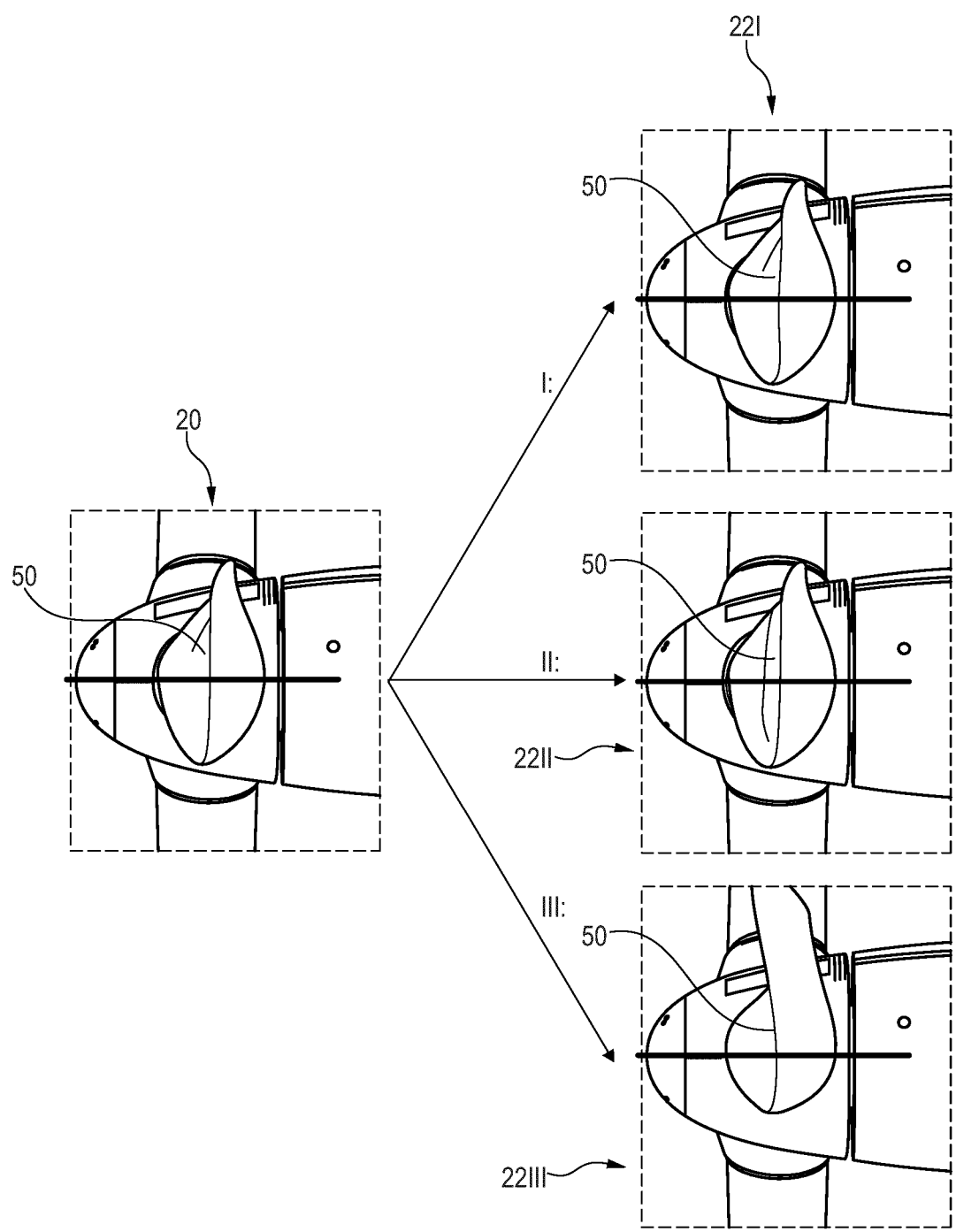
FIG. 6 illustrates computer implemented sorting of captured images.

FIG. 6 exemplifies sorting as disclosed. For sorting computer implemented procedures, software that uses a variety of image processing methods, such as pattern and feature recognition, pixel coordinates detection, pixel-by-pixel difference, brightness management, angle calculation, slope and proportion evaluations may be used. FIG. 6 illustrates a reference image 20 with a blade 50. With reference to the black line through the reference image 20, situation I is a result of a "perfect match", sorting out the captured image 22I where the blade 50 is identical or as identical as the blade 50 in the reference image 20. Situation II illustrates a situation where the captured images 22II is one or two, say more, frames off (i.e. the correct frame is actually some frames before/or after) compared to the blade 50 in the reference image 20. Situation III illustrates a situation where the captured image 22III has missed rotation during capturing or acquisition.

Thus, during the dynamic measurement, several pictures are taken for every blade by triggering the camera whenever the blade is passing through the selected region of interest. Out of these images, one is selected per blade in order to match the other two blades in terms of horizontal alignment (as indicated by the black line). This procedure defines the sorting step of the post-process analysis, completed prior to inspection, which in this case is prepared to be for the relative dynamic blade pitch misalignment calculation.

This procedure may be performed manually and/or automatically or with the input from an operator.

In case of operator assistance, the following steps may be performed. Step 1: One or more reference images 20 are selected by the operator. Step 2: A region of interest ROI such as the brightness of the tip of a blade 50, is also defined by the operator in order to isolate features of the image that assist the sorting procedure. Step 3: Using the input from the operator, the software automatically, per recorded rotation, identifies one image per blade that most matches the reference image/images in terms of horizontal blade alignment, such as situation I.

The procedure may also be preceded by a step of using a motion detection algorithm, a correlation between the different recorded blade passings is found. This correlation allows for a preliminary sorting that will assist and improve the whole or overall sorting procedure. This may be with respect to time and accuracy.

The advantage of this sorting procedure is that, regardless of any change in the rotational speed of the wind turbine, even within a rotation which will inevitably affect the triggering of the camera, one can efficiently select one image per blade that matches perfectly with the other two blades in terms of horizontal alignment.

An advantage of the automation of this procedure is time efficiency demands for operating on site directly after inspection. A manual sorting would require a couple of hours while the automated sorting can provide the same results in a couple of minutes.

Regarding the static measurement, there is no need for sorting since only one picture is taken for each blade at the same position and pitch angle.

Figure 7:
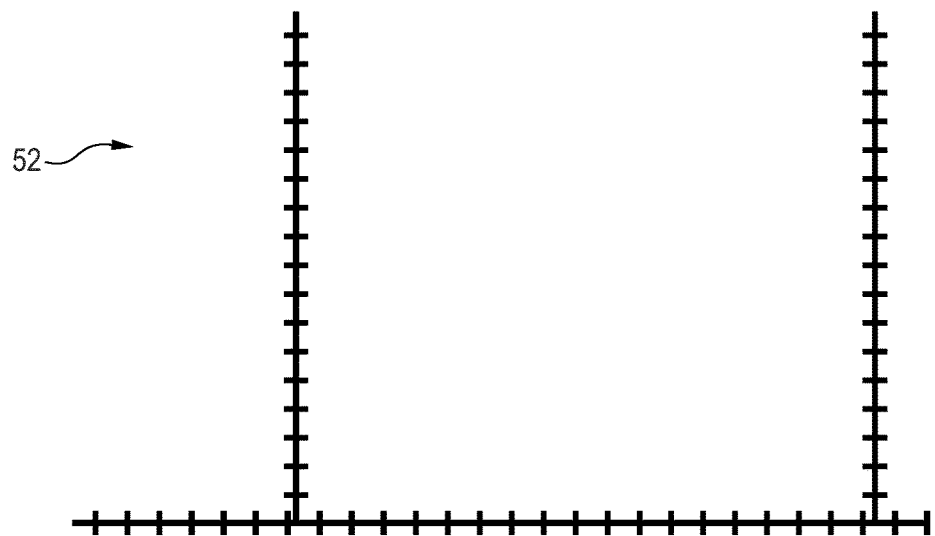
FIG. 7 illustrates an act of inspecting involving applying a set of blade metrics and an inspection of relative blade pitch misalignment.
Figure 7:
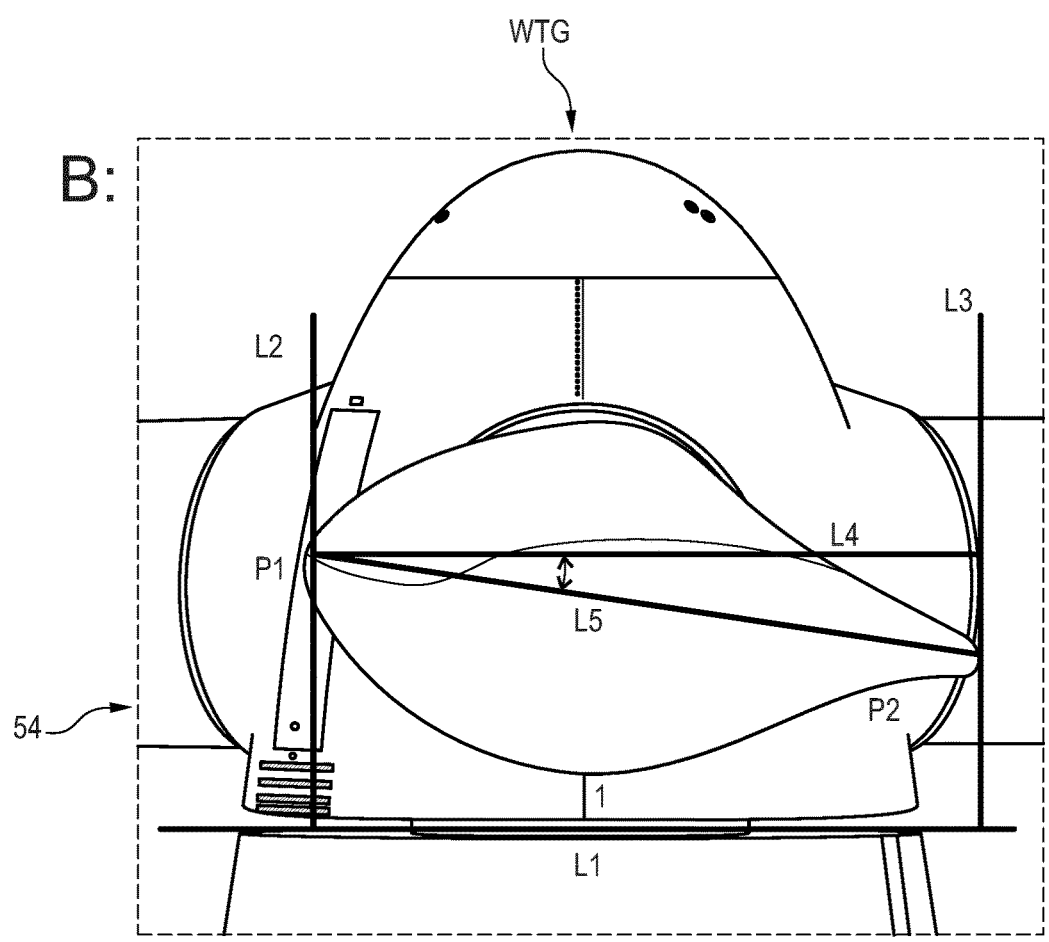
Figure 10:
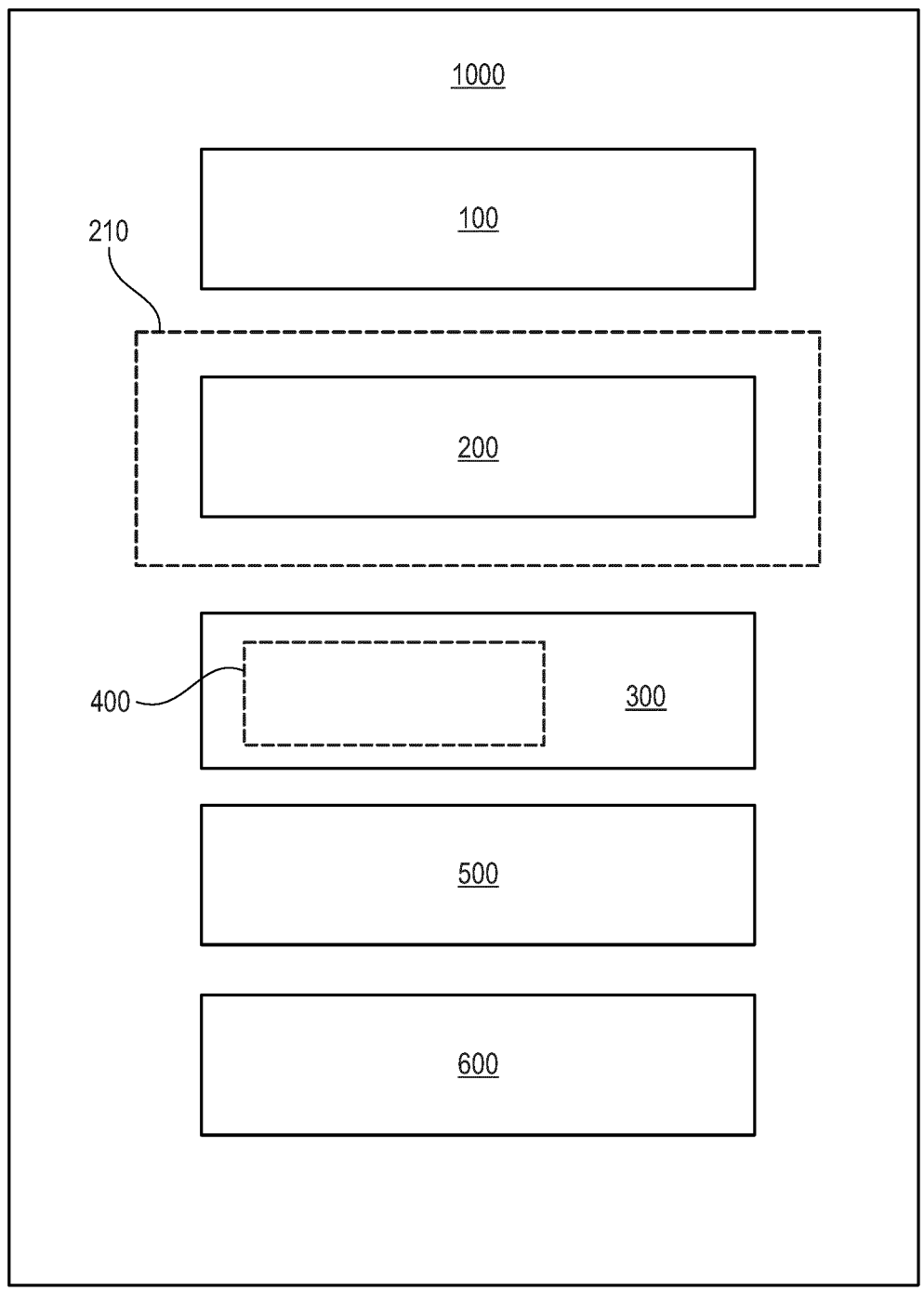
FIG. 10 illustrates a method of visually inspecting a wind turbine generator (WTG)

FIG. 7A illustrates, with reference to FIG. 10, how an act of inspecting 600 comprises an act of determining 610 a deviation amongst blades 50 wherein the act of inspecting 600 involves applying a set of blade metrics 52, e.g. scales as generically shown. Thereby, the act of comparing 500 can be performed by blade metrics 52 applied to the reference image 20 compared to the blade metrics 52 of least one captured image 22.

FIG. 7B illustrates a specific metric 52 that may be applied to a reference image 20 for an inspection of relative blade pitch misalignment. Again with reference to FIG. 10 and previous figures, inspection 600 comprises an act of determining 610 relative blade pitch misalignment 58 between at least two blades 50, wherein the act of inspecting 600 involves applying a set of pitch angle metrics 54 to the reference image 20 and the at least one other captured image 22, and wherein the act of comparing 500 is performed on the pitch angle metrics 54 of the reference image 20 and those of the at least one other captured image 22.

In the specific case the pitch angle metric 54 may be applied for both static and dynamic measurements using the following steps.

Step 1: Define a line (L1) which connects the two nacelle edges. Step 2: Define a second line L2 perpendicular (90°) to line L1, which is tangent to the leading edge of the blade. Step 3: Define the point on line L2, which is tangent to the leading edge of the blade as point P1. Step 4: Define a third line L3, perpendicular to line L1 and tangent to the trailing edge of the blade. Step 5: Define the point on line L3, which is tangent to the leading edge as P2. Step 6: Define a fourth line L4, perpendicular to lines L2 and L3 (parallel to L1), which will be crossing point P1. Step 7: Define a fifth line L5, connecting point P1 on the leading edge of the blade and point P2 on the trailing edge of the blade. Step 8: Calculate the (reference) angle between lines L4 and L5.

The outline method is robust and remains consistent regardless of the wind speed or the rotational speed of the rotor.

Figure 8:
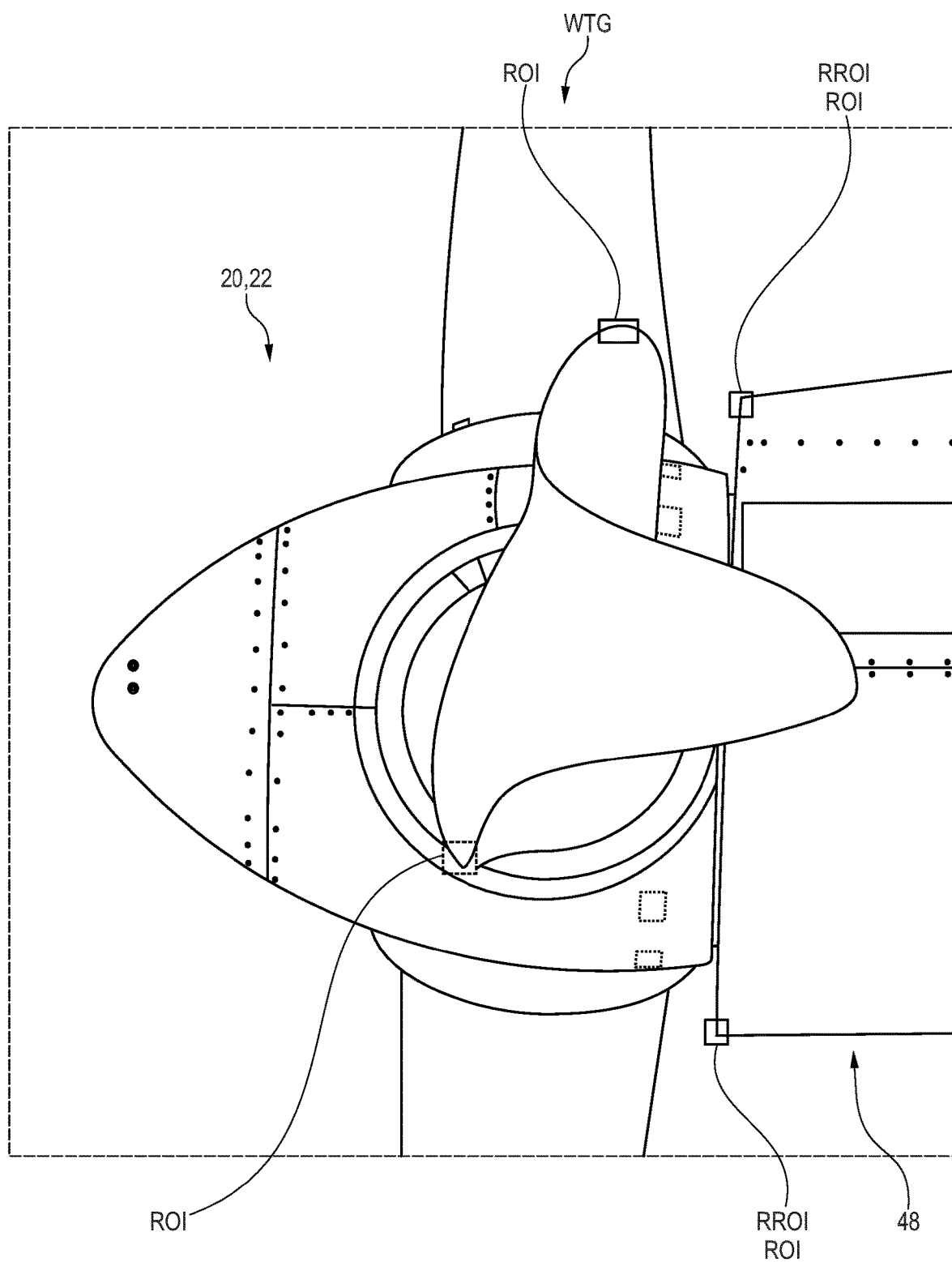
FIG. 8 illustrates acts of sorting and acts of comparing using an applied metric.
Figure 9:
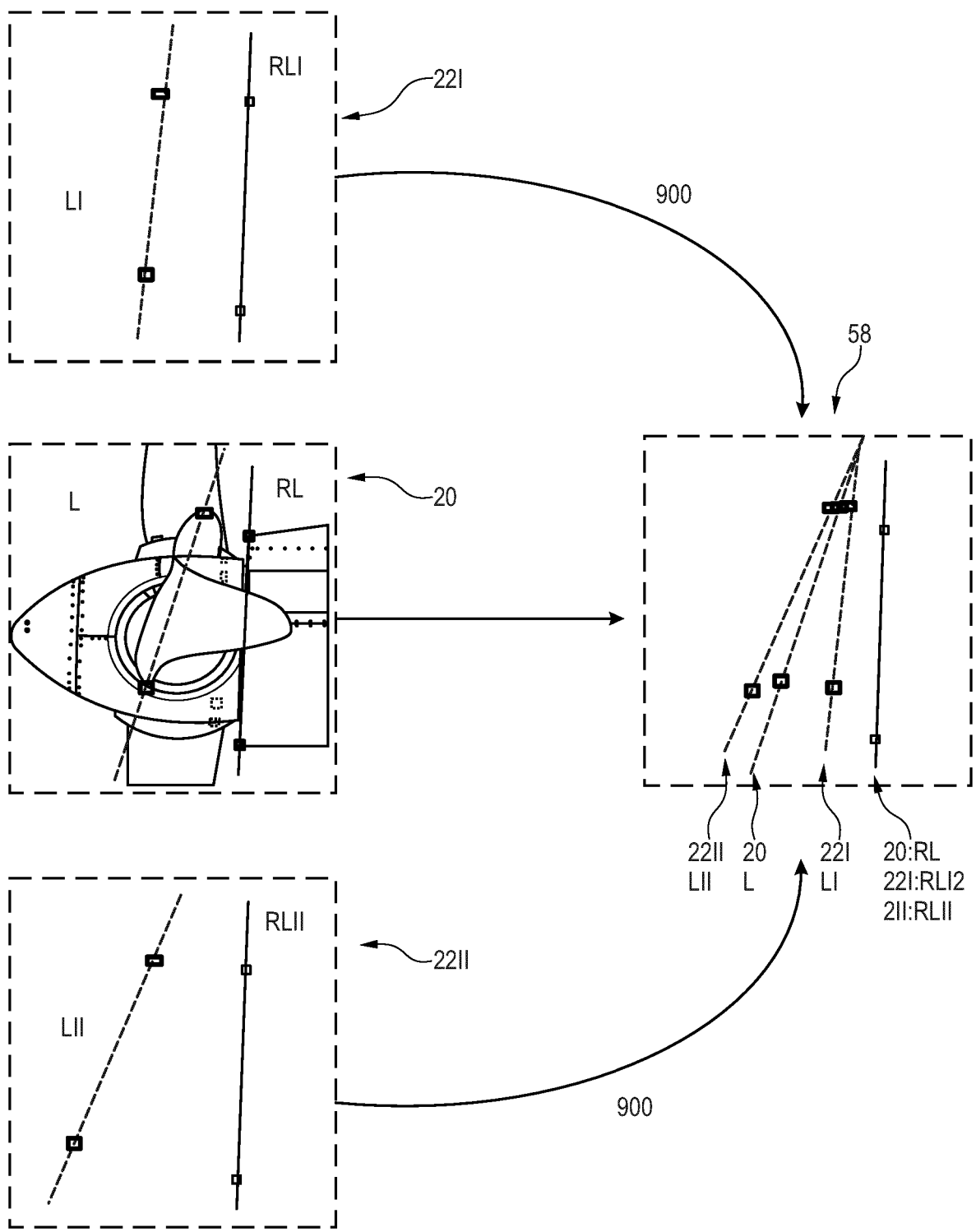
FIG. 9 illustrates further improvement in accuracy of measures from images by applying a transformation.

FIGS. 8 and 9 illustrate acts of sorting and comparing, using an applied metric 52 exemplified by a very simplified blade pitch metric 54 that can be defined on reference image 20 and/or captured or sorted images 22.

With reference to the outlined sorting 400 there may be involved an act of defining one or more regions of interest ROI of the wind turbine generator (WTG) on the reference image 20 and the at least one other captured image 22. FIG. 8 illustrates that at least one region of interest (ROI) is a reference region of interest (RROI) which is defined on the nacelle 48 of the WTG. In this case, two RROIs are defined allowing defining a line or a reference metric 52. Such reference regions of interests RROIs may be scaled according to actual dimensions; however, this may not be necessary. Furthermore, other regions of interest ROIs may be relative such as the indicated ROIs on the blade defined on the respective leading and trailing edge of the blade.

For the inspection analysis and calculation of the relative blade pitch misalignment between the wind turbine blades, a variety of image processing methods are used. These include pattern and feature recognition, pixel coordinate detection, pixel-by-pixel difference, brightness management, angle calculations, and slope and proportion evaluations.

In general an operator may apply the following procedure. Step 1: The operator selects multiple regions of interest ROI, as seen by the rectangles on FIG. 8, Some ROIs are going to be on fixed features, e.g. on the nacelle 48 and thus, be reference regions of interest RROIs. Other regions of interest may be defined as ROIs on moving features, e.g. blade 50. Step 2: The automated image analysis software detects the defined edges of the first image in all the other sorted blade images and calculates the angle difference between the two lines (e.g. nacelle line and blade line) for each of them. Step 3: After the calculation of the reference angles for each blade, the reference angle result for each blade is subtracted from the corresponding result of the previous blade, e.g. Blade A-Blade B, and the relative blade pitch misalignment between the three blades is calculated.

The advantage of the outline inspection of relative blade pitch misalignment between the wind turbine blades is the improvement in accuracy and time efficiency in order for the inspection to be performed on site.

FIG. 9 illustrates further improvement in accuracy of measures from images. This may be performed by applying a transformation as illustrated in continuation of FIG. 8. The transformation is a geometrical transformation.

The act of transforming 900 at least one other captured image 22 or sorted image is performed according to the reference region of interest (RROI) of the reference image 20.

In view of the measures or metrics, FIG. 9 illustrates two reference regions of interest (RROI) on the nacelle 48 defining a reference line RL. There are two moving or relative regions of interest ROIs on the blade 50 defining a line L. A simplified inspection of pitch angle may be the angle between lines RL and L, which may define a set of wind turbine metrics 40 defined by at least one relative region of interest ROI. Before the act of comparing 500, there may be an act of transforming 900 the least one relative region of interest (ROI) according to the transformed wind turbine metrics 40.

In example, a reference image 20 is selected, and, by reference regions of interests RROIs, the reference line RL is defined. The regions of interests ROIs on the blade define the line L. Likewise, a first and second captured image 22I, 22II comprise corresponding RLI, RLII reference lines and LI, LII lines.

The captured images 22I, 22II may be transformed 900 by aligning the reference lines RLI, RLII according to the reference line of RL of the reference image 20. Then image analysis may be performed.

The identified lines LI and LII may be transformed 900 by aligning the reference lines RLI, RLII according to the reference line of RL of the reference image 20.

The transformed lines LI, L2, or both may be used for inspecting 600 the WTG.

In example, LI may come from a blade B and may be compared to L of blade A; and say, yield a misalignment pitch angle between blade A and B. LII may come from a blade C and may be compared to L of blade A, etc.

In example, LI and LII may come from a blade B and be compared to L of blade A. Thus, multiple measurements of the same properties are performed allowing for a more accurate determination or statistical analysis.

Figure 2:
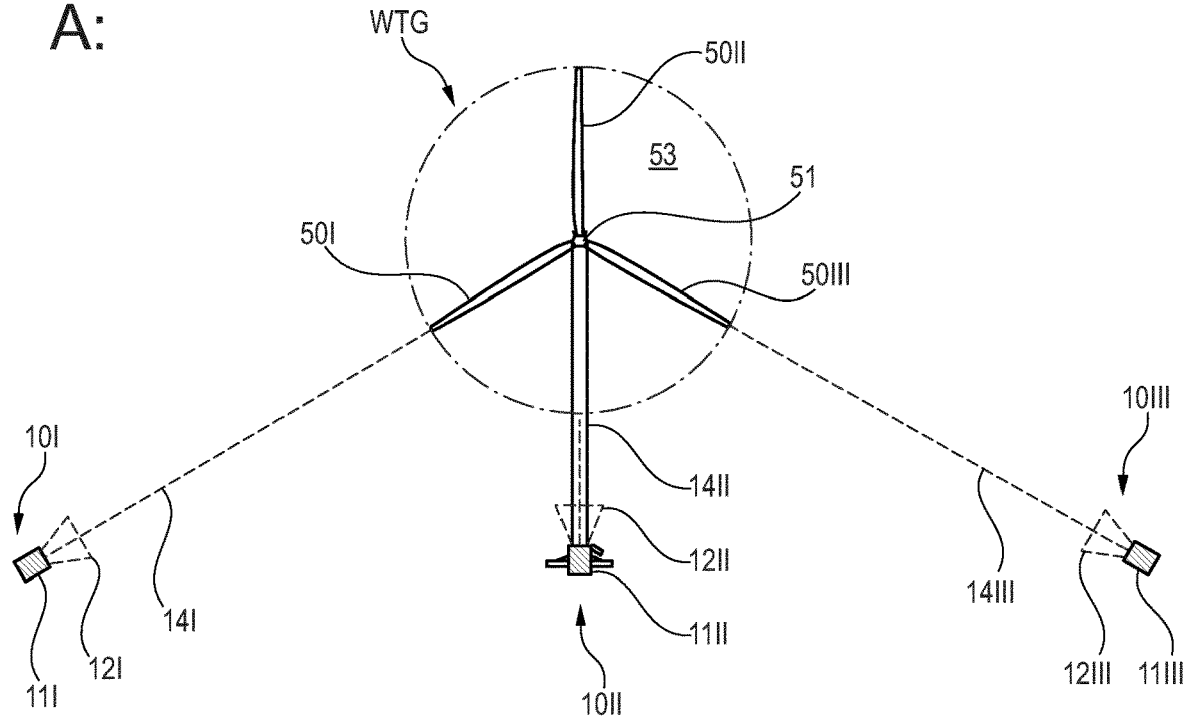
FIG. 2 illustrates visual inspection system and a wind turbine generator in two different planes.
Figure 2:
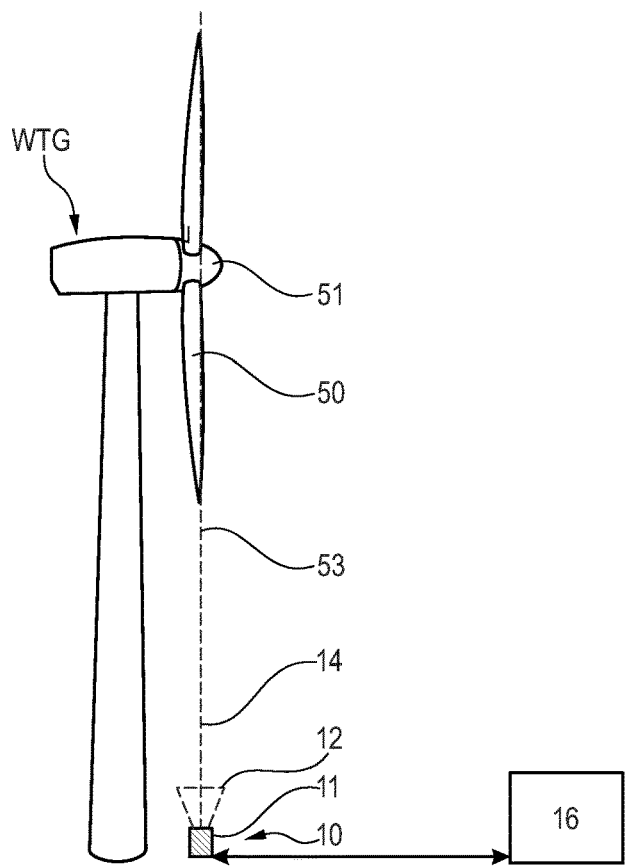

FIG. 10 illustrates a method of visually inspecting 1000 a wind turbine generator (WTG) as outlined herein, e.g. FIGS. 1 and 2, and parts thereof during operation. The method 1000 comprising acts as follows.

There is an act of pointing 100 a visual inspection system 10 with a field of view 12 about a line of sight 14 in a plane 53 of rotor blade 50 of the wind turbine generator WTG.

There is an act of capturing 200 multiple images 22 of the field of view 12 using the visual inspection system 10.

There is an act of selecting 300 at least one reference image 20 amongst the captured images 22.

There is an act of comparing 500 the at least other captured image 22 with the at least one reference image 20.

There is an act of inspecting 600 structural aspects of the wind turbine generator WTG as a function of the result of the act of comparing 500.

Optional or selectable, the act of capturing 200 may be performed after an act of triggering 210.

Optional or selectable, there is an act of sorting 400 or filtering the captured images 22. The act of sorting 400 is here illustrated as part of the act of selecting 300 but the act of sorting 400 may be performed as a separate act. The act of sorting 400 may be performed by use of image processing. The act of sorting may be filtering, selecting and deselecting images amongst the captured image, excluding the selected reference image.

Figure 11:
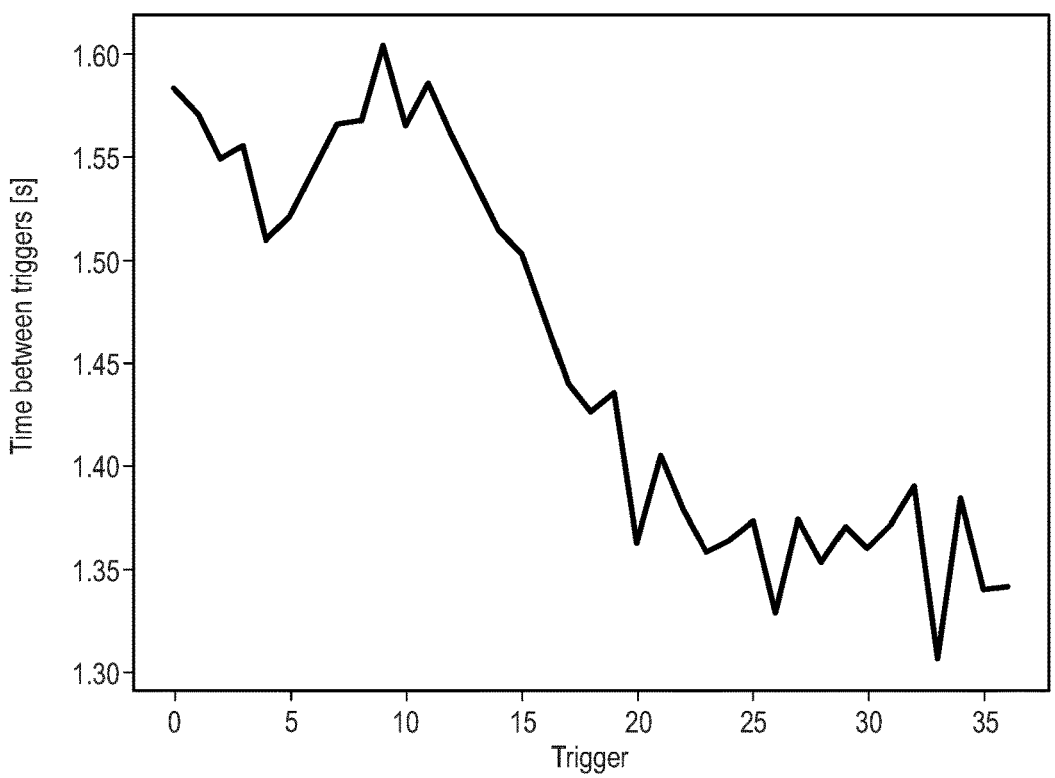
FIG. 11 illustrates an automated image labelling.
Figure 11:
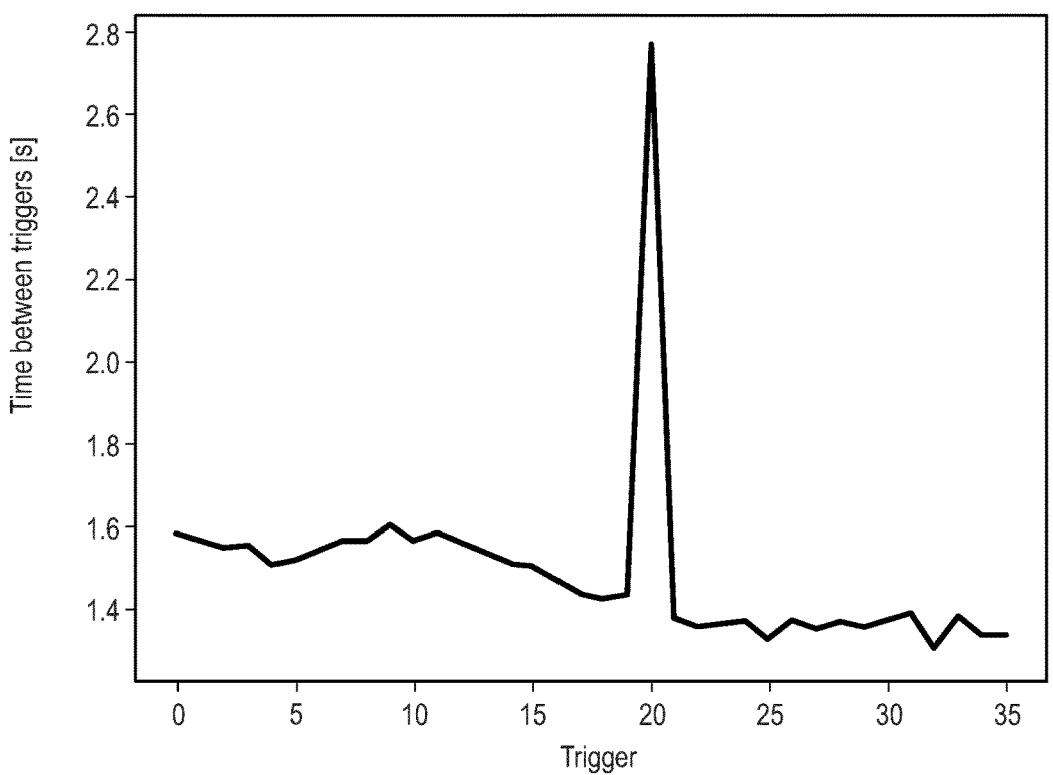

FIG. 11 illustrates an automated image labelling, where FIG. 11A illustrates an example of time periods between consecutive rotations for a case of 0 skipped triggers. Although the time between triggers varies, then the graph does not show any discontinuous data or triggers. This is an example of a desired case with 0 skipped triggers. The small fluctuations (1.3 s-1.6 s) are attributed to the rpm fluctuations of the wind turbine, but they are still in the desired levels. FIG. 11B illustrates an example of time periods between consecutive rotations in a case with a skipped triggering. This is an example of one skipped trigger. The skipped trigger is indicated from the high peak that can be seen in the plot (red circle), which shows that the time period between the $19^{th}$ and $20^{th}$ trigger was approximately double than the time period between the rest of the triggers and as a result an indication that one blade passing was missed. When there is such an indication for a skipped trigger and as a result a skipped blade, then the full rotation that would include this blade is filtered out.

For automated image or picture labelling, automated labelling procedure may be computer implemented and readily made available to the operator. The sorted images which correspond to each blade are labelled and sorted in consecutive rotations. In addition, using black images, the image noise level is reduced and results in an improvement of the image processing and detection techniques.

In an aspect there may be an act where the blade naming may selected by the operator. This blade naming is chosen based on numbers, letters, or blade serial numbers that may be seen on the external surface of the blades or the spinner and can indicate the blade naming convention of the wind turbine controller. If such an indication does not exist, the blades are named based on their sequence during the dynamic measurement.

In an aspect there may be an act of using the image timestamps, the automated labeling procedure labels and filters the sorted images into consecutive rotations. Hence, using the image timestamps and the time duration information between consecutive triggers, the automated labeling software labels and filters the sorted images into consecutive rotations.

The invention claimed is:

1. A method of visually inspecting a wind turbine generator and parts thereof during operation, the method including the following steps performed with a visual inspection system:
   pointing the visual inspection system with a field of view about a line of sight in a plane of a rotor blade of the wind turbine generator;
   triggering, based on the field of view, the visual inspection system;

capturing multiple images of the field of view using the visual inspection system;

selecting at least one reference image amongst the captured multiple images;

comparing at least one other image of the captured multiple images with the selected at least one reference image;

inspecting structural aspects of the wind turbine generator as a function of the result of comparing; and wherein the step of inspecting includes determining relative blade pitch misalignment between at least two rotor blades of the wind turbine generator, and applying a set of pitch angle metrics to the at least one reference image and the at least one other captured image, wherein the pitch angle metrics include a nacelle line defined by two reference regions of interest on the nacelle and a blade line defined by two regions of interest on the rotor blade; and wherein the step of comparing is performed on the pitch angle metrics of the at least one reference image and those of the at least one other captured image, wherein the step of triggering is according to a trigger which triggering setting is performed using a graphical user interface of the visual inspection system configured to present at least one captured image and with at least one means for an operator to adjust a trigger parameter, and wherein the trigger parameter is a brightness value of a region of interest.

2. The method according to claim 1, further including the step of sorting the captured images via image processing.

3. The method according to claim 2, wherein the step of sorting is performed on the basis of an input from an operator that defines a region of interest for sorting in the multiple captured images and the step of selecting the at least one reference image among the captured multiple images is based on the region of interest.

4. The method according to claim 1, wherein the step of capturing multiple images is performed after the triggering step based upon a trigger that is initiated as a function of a region of interest for triggering.

5. The method according to claim 1, wherein the step of inspecting further includes determining a deviation amongst the at least two rotor blades, and applying a set of blade metrics to the at least one reference image, and wherein the step of comparing includes applying blade metrics to the at least one reference image and comparing the blade metrics of the at least one reference image to the blade metrics of at least one captured image of the multiple capture images.

6. The method according to claim 1, wherein the two regions of interest on the rotor blade are the leading edge and the trailing edge.

7. The method according to claim 2, wherein the step of sorting includes defining one or more regions of interest for sorting of the wind turbine generator on the at least one reference image and the multiple captured images, wherein at least one region of interest of the at least two regions of interest is one of the two reference regions of interest and is a stationary feature.

8. The method according to claim 7, further including the steps of defining at least two reference regions of interest for sorting on the nacelle and a set of wind turbine metrics, defined by at least one relative region of interest, for sorting on a rotor blade.

9. The method according to claim 2, wherein the step of sorting includes sorting the captured images according to time duration between consecutive triggers and thereby filter out captured images where a trigger was skipped.

10. The method according to claim 2, wherein the step of sorting includes a preliminary sorting based on a correlations of different captured images.

11. The visual inspection system according to claim 1, further comprising:

an image capturing device configured with a field of view about a line of sight; and a computational unit configured with an interface means to define at least one region of interest on a captured image and for selecting at least one reference image.

12. The visual inspection system according to claim 11, wherein the image capturing device is a high speed camera or a scanning LiDAR camera.

13. A non-transitory computer-readable medium comprising instructions stored thereon, which when the instructions are executed by a computer cause the visual inspection system to perform the steps of claim 1.

14. The method of claim 1, wherein the two regions of interest on the rotor blade are the leading edge and the trailing edge at a max chord area.

15. The method of claim 1, further comprising providing an indication of relative blade pitch misalignment to a user of the visual inspection system via the graphical user interface.

* * * * *